(12) United States Patent
Abendroth

(10) Patent No.: US 7,890,243 B2
(45) Date of Patent: Feb. 15, 2011

(54) METHOD FOR CONTROLLING AN AUTOMATIC SHUT-OFF PROCESS AND/OR START-UP PROCESS OF AN INTERNAL COMBUSTION ENGINE IN A MOTOR VEHICLE

(75) Inventor: Dirk Abendroth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/549,096

(22) Filed: Aug. 27, 2009

(65) Prior Publication Data

US 2009/0319161 A1 Dec. 24, 2009

Related U.S. Application Data

(63) Continuation of application No. PCT/EP2008/001409, filed on Feb. 22, 2008.

(30) Foreign Application Priority Data

Feb. 28, 2007 (DE) .................. 10 2007 009 870

(51) Int. Cl.
*F02N 11/08* (2006.01)
(52) U.S. Cl. .................. 701/112; 701/113; 123/179.3; 123/179.4
(58) Field of Classification Search ............. 123/179.3, 123/179.4; 701/111–113
See application file for complete search history.

(56) References Cited

U.S. PATENT DOCUMENTS

| 3,941,204 | A |   | 3/1976 | Kurii et al. |
| 4,466,392 | A |   | 8/1984 | Uchida et al. |
| 5,109,945 | A | * | 5/1992 | Koga .................. 180/273 |
| 6,492,741 | B1 | * | 12/2002 | Morimoto et al. ......... 290/40 C |
| 6,526,931 | B1 |   | 3/2003 | Vilou |

(Continued)

FOREIGN PATENT DOCUMENTS

DE 24 47 579 A1 5/1975

(Continued)

OTHER PUBLICATIONS

Database WPI, Thomson Scientific, London, GB; AN DW200661; XP-002487775.

(Continued)

*Primary Examiner*—Hai H Huynh
(74) *Attorney, Agent, or Firm*—Crowell & Moring LLP

(57) ABSTRACT

A method controls an automatic shut-off process of an internal combustion engine having a start/stop device, when predetermined shut-off conditions are satisfied by corresponding influential variables, and controls a start-up process, when predetermined start-up conditions are satisfied by corresponding influential variables. Variables influencing the evaluation of the shut-off and/or start-up conditions include the presence of a vehicle key, the state of a tank ventilation system, the fuel tank fill level, the state of a diesel particulate filter, an activity state of a workshop mode, works mode, service mode and/or production mode, the current ambient temperature outside the vehicle, an evaluation of a device for detecting the occupancy, the detection of a cylinder synchronization process, an activity state of a driving speed control system, an auto hold function in vehicles with automatic transmissions, an electric parking brake, and/or a hill hold function.

18 Claims, 1 Drawing Sheet

U.S. PATENT DOCUMENTS

| | | |
|---|---|---|
| 6,532,926 B1 | 3/2003 | Kuroda et al. |
| 6,832,151 B2 * | 12/2004 | Kumazaki et al. ............ 701/112 |
| 7,130,731 B2 * | 10/2006 | Itoh et al. ..................... 701/54 |
| 7,269,499 B2 * | 9/2007 | Murakami et al. ........... 701/112 |
| 7,558,666 B2 * | 7/2009 | DiGonis ..................... 701/112 |
| 7,587,270 B2 * | 9/2009 | Tabata et al. ................ 701/112 |
| 2002/0074173 A1 | 6/2002 | Morimoto et al. |
| 2002/0096137 A1 | 7/2002 | Kobayashi et al. |
| 2004/0093127 A1 | 5/2004 | Onoyama et al. |
| 2004/0211381 A1 * | 10/2004 | Ogawa et al. ............ 123/179.4 |
| 2005/0019122 A1 | 1/2005 | Kado et al. |
| 2006/0142121 A1 | 6/2006 | Moriya |
| 2006/0236970 A1 * | 10/2006 | Inada et al. .............. 123/179.4 |
| 2007/0267238 A1 | 11/2007 | Guy et al. |
| 2008/0167765 A1 * | 7/2008 | Medema et al. ............... 701/19 |
| 2009/0063009 A1 * | 3/2009 | Jinno .......................... 701/102 |
| 2009/0241884 A1 * | 10/2009 | Saitoh et al. ............. 123/179.4 |
| 2010/0036590 A1 * | 2/2010 | Nakai .......................... 701/112 |
| 2010/0070151 A1 * | 3/2010 | Sonoda et al. ................. 701/96 |
| 2010/0076656 A1 * | 3/2010 | Hiyoshi et al. ................ 701/70 |
| 2010/0121502 A1 * | 5/2010 | Katayama et al. ............... 701/1 |

FOREIGN PATENT DOCUMENTS

| | | |
|---|---|---|
| DE | 32 27 289 A1 | 2/1983 |
| DE | 197 20 009 A1 | 11/1998 |
| DE | 100 38 280 A1 | 3/2001 |
| DE | 100 30 290 A1 | 8/2001 |
| DE | 101 61 343 A1 | 7/2002 |
| DE | 102 01 889 A1 | 8/2002 |
| DE | 102 11 461 C1 | 7/2003 |
| DE | 103 12 390 A1 | 10/2004 |
| DE | 603 07 013 T2 | 11/2006 |
| DE | 10 2005 037 466 A1 | 2/2007 |
| EP | 1 059 442 B1 | 12/2000 |
| EP | 1 416 142 A1 | 5/2004 |
| EP | 1 553 289 A1 | 7/2005 |
| EP | 1 717 116 A2 | 11/2006 |
| FR | 2 874 659 A1 | 3/2006 |
| JP | 58-18537 * | 2/1983 |
| JP | 10-131781 * | 5/1998 |
| JP | 11-301306 * | 11/1999 |
| JP | 2000-161101 * | 6/2000 |
| JP | 2000-282969 A | 10/2000 |
| JP | 2002-266674 A | 9/2002 |
| JP | 2004-225609 A | 8/2004 |
| JP | 2004-358577 A | 12/2004 |
| JP | 2006-214358 A | 8/2006 |
| JP | 2009-2312 * | 1/2009 |
| WO | WO 02/063163 A1 | 8/2002 |
| WO | WO 2007/017323 A1 | 2/2007 |

OTHER PUBLICATIONS

German Search Report dated Jul. 23, 2007 including partial English translation (Nine (9) pages).

International Search Report dated Mar. 11, 2009 including English translation (Ten (10) pages).

* cited by examiner

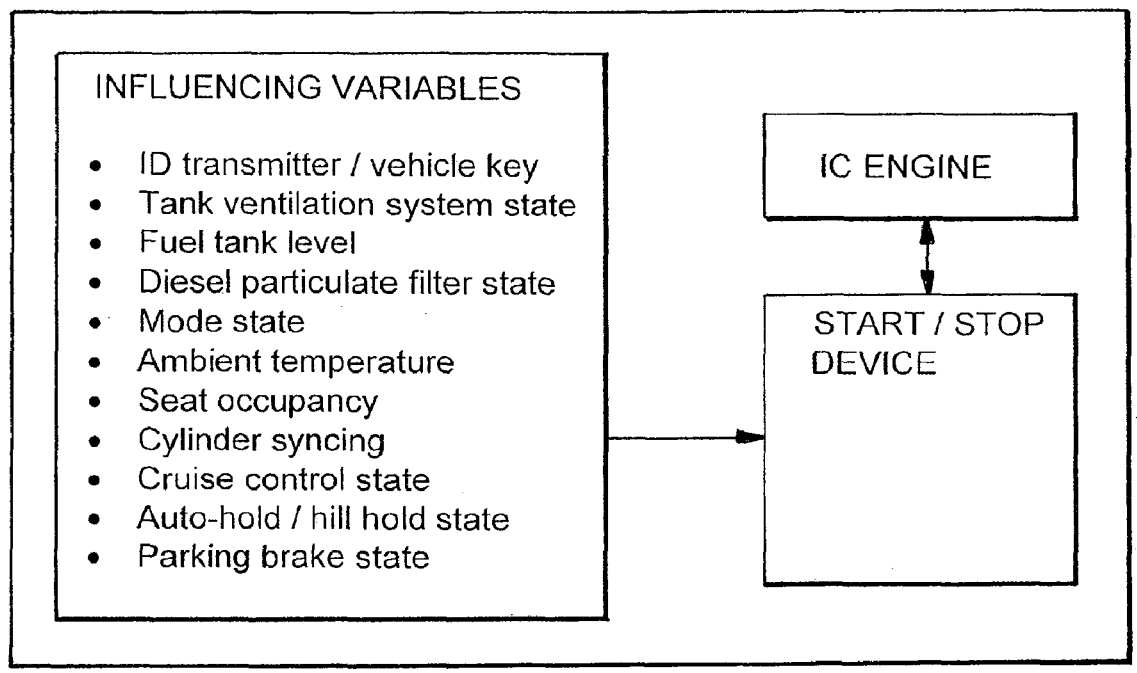
Figure

METHOD FOR CONTROLLING AN AUTOMATIC SHUT-OFF PROCESS AND/OR START-UP PROCESS OF AN INTERNAL COMBUSTION ENGINE IN A MOTOR VEHICLE

CROSS-REFERENCE TO RELATED APPLICATIONS

This application is a continuation of PCT International Application No. PCT/EP2008/001409, filed Feb. 22, 2008, which claims priority under 35U.S.C. §119to German Patent Application No. DE 10 2007 009 870.9, filed Feb. 28, 2007, the entire disclosures of which are herein expressly incorporated by reference.

BACKGROUND AND SUMMARY OF THE INVENTION

The invention relates to a method for controlling an automatic shut-off process and/or an automatic start-up process of an internal combustion engine in a motor vehicle.

In order to reduce fuel consumption and pollutant emissions, the current trend is to develop methods and systems (and to some extent they have also been already installed) that automatically switch-off the internal combustion engine of a motor vehicle under certain conditions and/or in the presence of predetermined shut-off conditions and automatically restart the internal combustion engine in the presence of predetermined start-up conditions. Such methods and systems, or rather such start/stop devices, are suited, above all, for urban traffic, in order to reduce the consumption of fuel, because in urban traffic the vehicle often comes to a standstill at traffic lights or owing to the traffic and because it is not necessary to run the internal combustion engine.

DE 101 61 343 A1 discloses an automatic stop and start-up control device for an internal combustion engine. In this case, the control device implements corresponding measures for shutting-off the internal combustion engine, when all of the shut-off conditions are met. For example, the speed of the vehicle has to be below a predetermined limit value. In the case of manual transmissions no gear may be engaged, and in the case of vehicles with automatic transmissions the gear shift position of the transmission must be in a neutral position.

Furthermore, DE 100 30 290 A1 also discloses a method and a system for automatically shutting-off and starting-up again an internal combustion engine. In this case, an automatic shut-off process is inhibited, when the charge state of the battery of the vehicle is below a predetermined lockout threshold. As additional shut-off conditions, it is also checked whether the speed of the vehicle is below a predetermined limit value, whether the transmission is in the idling position and whether the accelerator pedal is in the rest position.

DE 102 11 461 C1 discloses a method for automatically shutting-off and starting-up an internal combustion engine. In this case, a plurality of variables that influence the evaluation of the shut-off conditions and/or the start-up conditions are considered. Hence, it is possible to automatically shut-off the internal combustion engine, when at the same time the following shut-off conditions are satisfied:
a) the engine hood must be closed;
b) the speed of the motor vehicle is less than a predetermined speed threshold or is equal to zero;
c) the accelerator pedal is not actuated;
d) the brake element is actuated;
e) at least the driver's door is closed;
f) in the case of an automatic transmission, the selector lever is in a driving position;
g) the temperature of the exhaust gas system has reached its operating value;
h) the internal combustion engine has reached its operating temperature;
i) the transmission or transmission oil has reached its operating temperature, and, thus, even in the event that the engine is shut off, the pressure supply, and, therefore, the ability to engage the transmission and the avoidance of overheating in the transmission is guaranteed;
j) the air conditioning control unit of an air conditioning system produces an enable signal;
k) an enable signal is produced by a battery control device;
l) an optionally provided delay time has expired prior to the activation of the automatic shut-off process; and
m) an ON/OFF switch for manually switching on and off the start/stop device is in the ON state.

However, in addition to these shut-off conditions, which are known in the prior art, yet other influential variables have to be taken into consideration so that a start/stop device of this type will be accepted by the driver and so that no implausible states will occur.

Therefore, the object of the invention is to provide an improved method for controlling an automatic shut-off process and/or start-up process of an internal combustion engine having a start/stop device.

This and other objects are achieved by a method for controlling an automatic shut-off process and/or an automatic start-up process of an internal combustion engine in a motor vehicle having of a start/stop device, by which, following a start-up of the internal combustion engine by a person and after driving the motor vehicle, the internal combustion engine is automatically shut-off upon stopping the motor vehicle, when predetermined shut-off conditions are satisfied by corresponding influential variables, and/or by which an automatically shut-off internal combustion engine is automatically started, when predetermined start-up conditions are satisfied by corresponding influential variables. At least one of the following variables influencing the evaluation of the shut-off conditions and/or the start-up conditions is taken into consideration:
a) a presence or absence of at least one of a driver identification transmitter and a vehicle key;
b) a current state of a tank ventilation system;
c) a current tank fill level of a fuel tank;
d) a current state of a diesel particulate filter present in the vehicle;
e) an activity state of at least one of a workshop mode, a works mode, a service mode, and a production mode;
f) a current ambient temperature outside the vehicle;
g) an evaluation of a device for detecting occupancy of the driver's seat wherein the device for detecting occupancy of the seat is configured as at least one of a seat occupancy mat, a camera system, and a seat belt buckle evaluation system;
h) a detection of a cylinder synchronization process;
i) an activity state of a driving speed control system;
j) an activity state of an auto hold function in the motor vehicles having an automatic transmission;
k) an activity state of an electric parking brake; and
l) an activity state of a hill hold function.

In addition to the known variables that influence the control device of an automatic shut-off and/or start-up process by means of a start/stop device, a plethora of other influential variables must also be taken into consideration in accordance with an embodiment of the invention so that a start/stop device offered to the customer and intended for automatically shutting-off and starting-up the internal combustion engine experiences the highest possible acceptance by consumers and so that no implausible system or vehicle states occur.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a schematic block diagram illustrating the control method for the automatic shut-off and/or start-up process in accordance with an embodiment of the invention.

DETAILED DESCRIPTION OF THE DRAWING

According to an embodiment of the invention shown in the FIGURE, in addition to or as an alternative to influential variables known in the prior art, at least one of the following variables influencing the evaluation of the shut-off conditions and/or the start-up conditions should be taken into consideration:

a) the presence or non-presence of a driver identification transmitter and/or a vehicle key, which may or may not be designed optionally as a remote controlled vehicle key;
b) the current state of a tank ventilation system, preferably an activated charcoal filter, that is present in the vehicle;
c) the current tank fill level of a fuel tank;
d) the current state of a diesel particulate filter, which is present in the vehicle;
e) an activity state of a workshop mode and/or works mode and/or service mode and/or production mode;
f) the current ambient temperature outside the vehicle;
g) an evaluation of the device for detecting the occupancy of the driver's seat and optionally an evaluation of the device for detecting the occupancy of the passenger's seat, where the device for detecting the occupancy of the seat is designed in the form of a seat occupancy mat and/or a camera system and/or a seat belt buckle evaluation system;
h) the detection of a cylinder synchronization process;
i) an activity state of a driving speed control system;
j) an activity state of a so-called auto hold function in motor vehicles with automatic transmissions;
k) an activity state of an electric parking brake; and
l) an activity state of a so-called hill hold function.

The influential variable (a) described above is evaluated in such a manner that an automatic shut-off process and/or start-up process of the internal combustion engine is (are) inhibited, when no valid driver identification transmitter and/or vehicle key is detected. Therefore, the shut-off condition and/or the start-up condition lies (lie) in the fact that an automatic shut-off and/or start-up process can be carried out only if a valid driver identification transmitter and/or vehicle key is (are) detected. The condition for a valid driver identification transmitter and/or driver key has been satisfied when the driver identification transmitter is detected in such a manner that it would be possible to start-up again the internal combustion engine. This situation would not be the case, for example, if the driver identification transmitter, which does not have to be necessarily at a specific location in the vehicle, were, for example, to fall out of the window during the trip, or if the driver identification transmitter were defective and, thus could not send a valid signal to the vehicle. No vehicle key could be detected, for example, if the insertion device, into which the vehicle key has to be inserted at least when the internal combustion engine is started, is defective in such a manner that it does not detect the inserted vehicle key, or if the vehicle key is not inserted into the provided insertion device.

The inclusion of this influential variable in the evaluation of a shut-off condition is important because although it is possible to drive without a key under certain conditions, it is, nevertheless, not possible to start the internal combustion engine. At that point, it would no longer be possible to automatically start an automatically shut-off internal combustion engine. The result would be a so-called "stranded vehicle." Hence, this situation would lead to the driver perceiving the start/stop device as highly deficient in convenience and comfort.

In one advantageous embodiment of the invention, the start/stop device can also be totally deactivated, when following an initially detected valid driver identification transmitter and/or driver key, a valid driver identification transmitter and/or vehicle key is no longer detected at a later date.

The influential variable (b) described above is evaluated in such a manner that an automatic shut-off process and/or start-up process of the internal combustion engine is (are) inhibited, when a tank ventilation system, which is present in the vehicle, is in the saturation range. If the tank ventilation system is an activated charcoal filter, an automatic shut-off and/or start-up process of the internal combustion engine has to be inhibited, if the load on the activated charcoal filter is greater than a predetermined load limit value. Thus, the shut-off condition and/or start-up condition lies (lie) in the fact that an automatic shut-off and/or start-up process can be carried out only if the load on the activated charcoal filter is less than the predetermined load limit value (including hysteresis, etc.).

The inclusion of this influential variable in the evaluation of a shut-off condition is important because otherwise the automatic shut-off process of the internal combustion engine could result in the activated charcoal filter being punctured, and, hence, the activated charcoal filter could become ineffective in terms of its operating mode. As a consequence, a larger quantity of pollutants could escape unintentionally, or an annoying odor could build up in the passenger compartment.

The influential variable (c) described above is evaluated in such a manner that an automatic shut-off process of the internal combustion engine is inhibited, when the tank fill level of a fuel tank or an average value or a maximum or minimum value of several tank fill levels is less than a predetermined tank fill level limit value. Thus, the shut-off condition lies in the fact that an automatic shut-off process can be carried out only if the tank fill level of the fuel tank is greater than the predetermined tank fill level limit value.

The inclusion of this influential variable in the evaluation of a shut-off condition is important because in the event that the internal combustion engine is automatically shut-off and in the event of a very low tank fill level, under some circumstances it would no longer be possible to shut-off the internal combustion engine. Then an automatically shut-off internal combustion engine would no longer be able to be started, and, as a result, the driver would perceive a considerable lack of comfort and convenience. The tank fill level limit value can be specified advantageously as a variable, for example, as a function of the current inclination of the motor vehicle. This measure is practical, because it is possible for the intake to suck in a vacuous region when the motor vehicle is slanted and when an intake of fuel is no longer possible.

The influential variable (d) described above is evaluated in such a manner that an automatic shut-off process of the internal combustion engine is inhibited, when a diesel particulate filter, which is present in the vehicle, is in a regeneration phase. Thus, the shut-off condition lies in the fact that an automatic shut-off process can be carried out only if the diesel particulate filter is not in a regeneration phase.

The inclusion of this influential variable in the evaluation of a shut-off condition is important because otherwise the automatic shut-off and/or start-up process of the internal combustion engine could result in damage to the diesel particulate filter, or the diesel particulate filter could become ineffective in terms of its operating mode. As a consequence, a larger quantity of pollutants could be emitted.

The influential variable (e) described above is evaluated in such a manner that an automatic shut-off and/or start-up process of the internal combustion engine is inhibited, when a workshop mode, works mode, service mode, and/or production mode is (are) actively engaged in the motor vehicle. Thus, this shut-off condition lies in the fact that an automatic shut-off and/or start-up process can be carried out only if an active workshop mode and/or works mode, service mode, and/or production mode is (are) not detected.

The inclusion of this influential variable in the evaluation of a shut-off condition is important because such a mode is usually active only if the motor vehicle is not fully functional. If, nevertheless, an automatic shut-off and/or start-up process were to be initiated, it could lead to (additional) damage to a system in the motor vehicle, could endanger the staff, works personnel or service personnel or could prolong the production time.

In one advantageous embodiment of the invention, the start/stop device can also be totally deactivated, if it is detected that a workshop mode, works mode, service mode, and/or production mode is (are) active. Thus, the works operations, the service operations and the production operations can be accelerated or structured for greater safety and reliability.

The influential variable (f) described above is evaluated in such a manner that an automatic shut-off and/or start-up process of the internal combustion engine is inhibited, when the ambient temperature is not within a predetermined temperature range. Thus, this shut-off condition lies in the fact that an automatic shut-off process and/or start-up process can be carried out only if the current ambient temperature outside the motor vehicle is greater than a predetermined lower temperature limit value and is simultaneously less than a predetermined upper temperature limit value.

The inclusion of this influential variable in the evaluation of a shut-off condition is important because otherwise the result could be an unexpected and/or implausible shut-off and/or start-up response of the internal combustion engine or damage to various vehicle systems. The lower temperature limit value can be advantageously identical to a temperature limit value that is already electronically scanned in the vehicle, and, on being exceeded, a warning signal is emitted in any event.

The influential variable (g) described above is evaluated in such a manner that an automatic shut-off and/or start-up process of the internal combustion engine is inhibited, when the evaluation of a device for detecting the occupancy of the driver's seat and optionally the evaluation of a device for detecting the occupancy of the passenger's seat do not indicate that a seat is occupied. Thus, this shut-off condition lies in the fact that an automatic shut-off and/or start-up process can be carried out only if the evaluation of a device for detecting the occupancy of the driver's seat indicates that the driver's seat is occupied by a person.

The occupancy of a seat can be detected with a variety of systems or combinations of systems. For example, the occupancy of a seat can be detected by ways of a seat occupancy mat and/or with a camera system. In addition or as an alternative, the state of a seat belt buckle can also be evaluated. In addition, it can also be determined whether the driver's door and/or the passenger's door is (are) open or closed. Then, the passenger's door can be an important factor when the driver cannot leave on the driver's side owing to a lack of space, but rather can leave only by way of the passenger's door.

The inclusion of this influential variable—thus the evaluation of a device for detecting the occupancy of the seat in the form of a seat occupancy mat, an interior camera, and/or a seat belt buckle evaluating unit—in the evaluation of a shut-off condition is important because an automatic shut-off and/or start-up process without the presence of a driver could lead to a hazard, for example, if the internal combustion engine is started again when, in the meantime, the driver has left the vehicle.

The influential variable (h) described above is evaluated in such a manner that an automatic shut-off process of the internal combustion engine is inhibited, when a cylinder synchronization process is detected. Thus, this shut-off condition lies in the fact that an automatic shut-off process can be carried out only if no cylinder synchronization process is present and/or is detected.

The inclusion of this influential variable in the evaluation of a shut-off condition is important because otherwise it can occur that the shut-off process is carried out exactly at the instance of the cylinder synchronization adaptation. In this case, the result is a stop response at an enormous loss of comfort and convenience and a worse starting position for the next automatic start-up (loss of start-up comfort).

The influential variable (i) described above is evaluated in such a manner that an automatic shut-off and/or start-up process of the internal combustion engine is inhibited, when at the same time a speed control system, preferably a combined distance and speed control system, is active. Thus, the shut-off condition and/or start-up condition lies (lie) in the fact that an automatic shut-off and/or start-up process can be carried out only if no active driving speed control mode is detected.

The inclusion of this influential variable in the evaluation of a shut-off condition is important because under some circumstances the motor vehicle in the speed control mode could reach a speed that is detected as a standstill, and then the internal combustion engine is shut off unintentionally. This could be the case, for example, when at a slow control speed a steep incline has to be suddenly driven up. Then the speed of the vehicle could be almost zero for a short period of time owing to a limited torque reserve and a control delay.

The influential variable (j) described above is evaluated in such a manner that an automatic start-up process of the internal combustion engine is inhibited, when in the event of an active so-called "auto hold function," the brake pedal is released as long as the acceleration pedal is not applied. Thus, the start-up condition lies in the fact that an automatic start-up process in a motor vehicle with an automatic transmission and an active "auto hold function" is carried out only if the acceleration pedal is depressed so far that the acceleration pedal position deviates from its base position by more than a predetermined acceleration pedal position threshold value.

The inclusion of this influential variable in the evaluation of a start-up condition is important because otherwise the internal combustion engine would always be started when the so-called auto hold function could still intervene (under the condition that a conventional start-up condition in motor vehicles with automatic transmissions is the release of a brake). Therefore, the auto hold function could not be applied in combination with the automatic start/stop function.

In a motor vehicle with an automatic transmission, a start-up condition for automatically starting an internal combustion engine in a motor vehicle lies in the fact that an automatic start-up process of the internal combustion engine is possible only if, upon releasing the brake, no auto hold function is active.

In conformity with the influential variable, described under j), the influential variable, described under k), is evaluated advantageously in such a manner that an automatic start-up process of the internal combustion engine is inhibited when an electric parking brake, which is present in the vehicle, is active. Thus, the start-up condition lies in the fact that an automatic start-up process in a motor vehicle with an electric parking brake can be carried out only if the electric parking brake is not active.

The inclusion of this influential variable in the evaluation of a shut-off condition and/or start-up condition is important because otherwise the function of the electric parking brake would become meaningless, if the internal combustion engine would already be started, when the electric parking brake could still intervene.

In conformity with the influential variable, described under j) and k), the influential variable, described under l), is evaluated advantageously in such a manner that an automatic start-up process of the internal combustion engine is inhibited when in the case of an active so-called hill hold function, which is present in the vehicle, the acceleration pedal is not applied. Thus, the start-up condition lies in the fact that an automatic start-up process in a motor vehicle with a hill hold function can be carried out only if in the case of an active hill hold function the acceleration pedal is applied so far that the acceleration pedal position deviates from its base position by more than a predetermined acceleration pedal position threshold value. An alternative embodiment of the start-up condition lies in the fact that an automatic start-up process in a motor vehicle with a so-called hill hold function can be carried out only if the hill hold function is not active.

The inclusion of this influential variable in the evaluation of a start-up condition is important because otherwise the so-called hill hold function would be meaningless, if the internal combustion engine would already be started, when the so-called hill hold function could still intervene.

The evaluation of these aforementioned influential variables within the framework of shut-off conditions and/or start-up conditions makes the system, which carries out the automatic shut-off and start-up processes, significantly more transparent and leads to less implausible vehicle states. In addition, the interaction with other operating control systems is resolved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling at least one of an automatic shut-off and start-up process of an internal combustion engine in a motor vehicle having a start/stop device, the method comprising the acts of:

automatically shutting-off the internal combustion engine after driving the motor vehicle upon stopping the motor vehicle when predetermined shut-off conditions are met by corresponding influencing variables;

automatically starting-up the internal combustion engine after being automatically shut-off when predetermined start-up conditions are satisfied by corresponding influencing variables; and wherein at least one of the following influencing variables are evaluated to meet said at least one of the predetermined shut-off and start-up conditions:

a) in the case of the automatic shut-off process, a presence or absence of at least one of a driver identification transmitter and a vehicle key;

b) a current saturation state of a tank ventilation system;

c) in the case of the automatic shut-off process, a current tank fill level of a fuel tank;

d) an activity state of at least one of a workshop mode, a works mode, a service mode, and a production mode;

e) an evaluation of a device for detecting occupancy of the driver's seat wherein the device for detecting occupancy of the seat is configured as at least one of a seat occupancy mat, a camera system, and a seat belt buckle evaluation system;

f) a detection of a cylinder synchronization process;

g) an activity state of a driving speed control system;

h) in the case of the automatic start-up process, an activity state of an auto hold function in a motor vehicle having an automatic transmission; and i) in the case of the automatic start-up process, an activity state of a hill hold function.

2. The method according to claim 1, wherein the acts of automatically shutting-off the internal combustion engine is possible only if at least one of a valid driver identification transmitter and vehicle key is detected.

3. The method according to claim 1, wherein the acts of automatically shutting-off and starting-up the internal combustion engine are only possible if a load on an activated charcoal filter of the tank ventilation system is less than a predetermined load limit value.

4. The method according to claim 1, wherein the act of automatically shutting-off the internal combustion engine is only possible if the current tank fill level of the fuel tank is greater than a predetermined tank fill level limit value.

5. The method according to claim 4, wherein the current tank fill level is at least one of an average, maximum and minimum value of several tank fill levels.

6. The method according to claim 1, wherein the act of automatically shutting-off the internal combustion engine is only possible if at least one of: (i) a current state of the diesel particulate filter is not in a regeneration phase, and (ii) a load on the diesel particulate filter exceeds a predetermined limit value.

7. The method according to claim 1, wherein the acts of automatically shutting-off and starting-up the internal combustion engine are only possible if at least one of an active workshop mode, works mode, service mode, and production mode is not detected.

8. The method according to claim 7, wherein when at least one of the active workshop mode, works mode, service mode, and production mode is detected, the method deactivates the start/stop device for automatically shutting-off and starting-up the internal combustion engine.

9. The method according to claim 1, wherein the acts of automatically shutting-off and starting-up the internal combustion engine are only possible if the current ambient temperature is in a range between a lower and an upper temperature limit value.

10. The method according to claim 1, wherein the acts of automatically shutting-off and starting-up the internal combustion engine are only possible if a seat occupancy detection unit detects an occupied driver's seat.

11. The method according to claim 10, wherein the seat occupancy detection unit is operatively configured to evaluate a closed state of at least one of a driver-side door and passenger-side door of the motor vehicle.

12. The method according to claim 1, wherein the act of automatically shutting-off the internal combustion engine is only possible if the cylinder synchronization process is not detected.

13. The method according to claim 1, wherein the acts of automatically shutting-off and starting-up the internal combustion engine are only possible if the driving speed control system is not active.

14. The method according to claim 1, wherein the act of automatically starting-up the internal combustion engine is only possible if the auto hold function is active and an acceleration pedal is depressed so as to deviate from a base position by greater than a predetermined acceleration pedal position threshold value.

15. The method according to claim 1, wherein the act of automatically starting-up the internal combustion engine is only possible if, upon releasing a brake, the auto hold function is not active.

16. The method according to claim 1, wherein the act of automatically starting-up the internal combustion engine is only possible if an electric parking brake is active and an acceleration pedal is depressed so as to deviate from a base position by greater than a predetermined acceleration pedal position threshold value.

17. The method according to claim 1, wherein the act of automatically starting-up the internal combustion engine is only possible if the hill hold function is not active.

18. The method according to claim 1, wherein the act of automatically starting-up the internal combustion engine is only possible if the hill hold function is active and the acceleration pedal is depressed so as to deviate from a base position by more than a predetermined acceleration pedal position threshold value.

* * * * *